(12) United States Patent
Rizk et al.

(10) Patent No.: US 7,150,507 B2
(45) Date of Patent: Dec. 19, 2006

(54) SELF CLEANING ORIFICE

(75) Inventors: Gamil M. Rizk, Canton, MI (US); Leon Leventhal, Canton, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/738,848

(22) Filed: Dec. 17, 2003

(65) Prior Publication Data

US 2005/0134112 A1    Jun. 23, 2005

(51) Int. Cl.
*B60T 15/46* (2006.01)

(52) U.S. Cl. ..................................... 303/84.1

(58) Field of Classification Search .............. 303/87, 303/113.1–119.3, 68, 69, 901, 900, 84.1; 138/40–46; 137/504, 513.5, 244; 251/118, 251/120

See application file for complete search history.

(56) References Cited

U.S. PATENT DOCUMENTS

| | | | |
|---|---|---|---|
| 2,181,581 A | 11/1939 | Fraser | |
| 2,710,736 A | 6/1955 | Miller | |
| 2,781,060 A * | 2/1957 | Frey | ............................ 138/46 |
| 2,991,795 A | 7/1961 | Fraser et al. | |
| 3,065,948 A | 11/1962 | Nolan | |
| 3,595,265 A * | 7/1971 | Cryder et al. | ............ 137/513.5 |
| 3,608,576 A | 9/1971 | Wilhelm | |
| 3,782,412 A * | 1/1974 | Darash | ........................ 137/514 |
| 4,093,177 A | 6/1978 | Morris et al. | |
| 4,165,857 A | 8/1979 | Morris et al. | |
| 4,355,849 A * | 10/1982 | Wilson | ..................... 303/116.3 |
| 4,524,731 A * | 6/1985 | Rhoads | ..................... 123/90.57 |
| 4,573,238 A | 3/1986 | Phillips | |
| 4,794,267 A | 12/1988 | Stevens | |
| 4,819,688 A | 4/1989 | Field | |
| 4,997,357 A | 3/1991 | Eirich et al. | |
| 5,033,676 A | 7/1991 | King et al. | |
| 5,058,961 A * | 10/1991 | Mergenthaler et al. | .. 303/115.4 |
| 5,115,978 A | 5/1992 | King et al. | |
| 5,234,031 A | 8/1993 | Pickett et al. | |
| 5,613,518 A * | 3/1997 | Rakieski | .................. 137/513.5 |
| 5,673,978 A | 10/1997 | Linkner, Jr. | |
| 5,860,709 A * | 1/1999 | Hosoya | .................... 303/117.1 |
| 6,280,005 B1 | 8/2001 | Pepper et al. | |
| 6,309,033 B1 | 10/2001 | Zaviska | |

* cited by examiner

*Primary Examiner*—Melanie Torres
(74) *Attorney, Agent, or Firm*—MacMillan, Sobanski & Todd, LLC

(57) ABSTRACT

A self-cleaning orifice includes a housing having a bore defined therein. The bore includes a first diameter inlet portion and a second diameter outlet portion, with a seating surface defined between the inlet and outlet portions. A movable body having a seating surface with a groove defined thereon is disposed within the outlet portion of the bore. The body is movable relative to the housing to a first position in which the seating surface of the body is seated against the seating surface of the housing and provides a restricted flow between the inlet portion and the outlet portion of the bore The body is also movable relative to the housing to a second position in which the seating surface of the body is spaced apart from the seating surface of the housing creating an unrestricted fluid flow path between the inlet portion and the outlet portion of the bore.

16 Claims, 8 Drawing Sheets

SELF CLEANING ORIFICE

TECHNICAL FIELD OF THE INVENTION

This invention relates in general to fluid flow in anti-lock braking systems. In particular, this invention relates to a self-cleaning orifice that assists in regulating fluid flow between a master cylinder and a positive displacement pump in an anti-lock braking system.

BACKGROUND OF THE INVENTION

The ability to independently control the braking force at each of the vehicle's wheels, together with certain special sensors, enables operation of a vehicle brake system in various special modes of operation. One of these special modes of operation is an anti-lock braking mode of operation, commonly referred to as ABS (for Anti-lock Brake System). Sensors in the vehicle brake system monitor the speed of the vehicle's wheels during braking. If the braking force demanded at a brake for a vehicle wheel causes the wheel to slip, the brake system can momentarily reduce the braking force of the brake at that wheel to allow the wheel to stop slipping, and thus provide optimal braking for the vehicle.

Another of these special modes of operation is traction control. During vehicle acceleration, a vehicle wheel may lose traction, and begin to spin. In the traction control mode of braking, the brake system is electronically actuated, without the driver stepping on the vehicle brake pedal, to individually brake the spinning wheel. When the wheel has slowed sufficiently to regain traction, the brake is released.

In most hydraulic and electro-hydraulic braking systems, solenoid valves are used to control the selective brake pressure in the individual brake lines for both the anti-lock and traction control modes of operation. In a typical integrated anti-lock brake and traction control system, isolation and supply solenoid valves are used to either restrict or facilitate fluid flow from a master cylinder through an individual brake solenoid valve to apply fluid pressure to actuate an individual wheel brake. A dump solenoid valve is generally also provided in conjunction with each individual brake solenoid valve to release the pressurized fluid from the individual wheel brakes and to allow the pressurized fluid to flow to an accumulator. A positive displacement pump then pumps the fluid from the accumulator back through the system to return the fluid to a fluid reservoir for the master cylinder.

During the operation of anti-lock and traction control braking systems, the fluid flowing throughout the system is often subject to pressure and temperature differentials. In particular, a pressure differential generally exists between the fluid pumped from the accumulator back to the master cylinder fluid reservoir. Therefore, an orifice is often used to restrict fluid flow such that pressure is regulated within the system. However, often debris or contaminants can enter the fluid within the braking system, which can subsequently cause the orifice to become clogged and therefore ineffective in its ability to regulate the pressure of the fluid flow in the system.

SUMMARY OF THE INVENTION

This invention relates to a self-cleaning fluid-flow restricting orifice. More specifically, in a first embodiment of the invention, a movable body component of the orifice is configured to provide restricted flow through a constricted passageway in a first position, and to move to a second position in which flow can bypass the constricted passageway in an unrestricted manner and a portion of the flow is directed to flush the constricted passageway. In a second embodiment of the invention, the movable body component is configured such that the movable body is axially reversible in the assembly thereof, but otherwise functions similar to the first embodiment.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
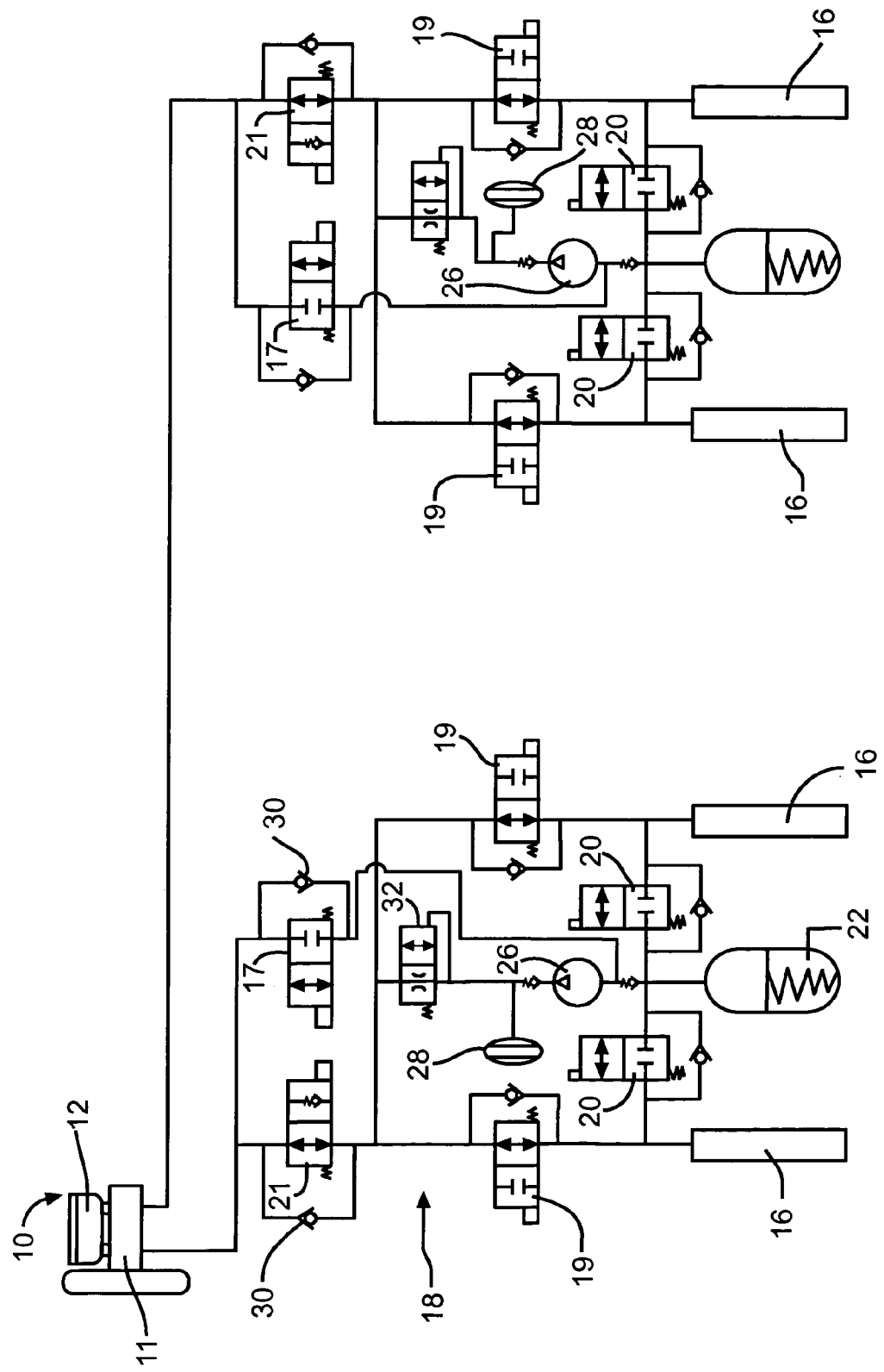
FIG. 1 is a schematic diagram of an anti-lock braking system containing the self-cleaning orifice of the present invention.

Referring now to the drawings, there is illustrated in FIG. 1 a vehicular brake system, indicated generally at 10, that may incorporate the self-cleaning orifice of the present invention. System 10 includes valves and other components described below to provide an anti-lock braking function. In other embodiments, system 10 can also include components to provide traction control and/or vehicle stability control functions. In yet other embodiments, system 10 can be formed as an electronic brake management system.

The brake system 10 includes a brake pedal (not shown) connected to a master cylinder 11, having a fluid reservoir 12, for providing pressurized brake fluid to a plurality of wheel brakes 16. The wheel brakes 16 may be of any suitable type found on vehicles, such as drum brakes or disc brakes.

The brake system 10 also includes a hydraulic control unit (HCU), indicated generally at 18, which is connected in fluid communication between the master cylinder 11 and each wheel brake 16. The HCU 18 includes a plurality of control valves and other components described below. Fluid conduits are provided in the HCU 18 between the control valves to provide fluid communication between the valves and other components. The HCU 18 may also house corresponding components for other circuits of the vehicle, such as the traction control system.

To control the wheel brakes 16 during normal braking operation of the vehicle, a supply valve 17 is provided to allow fluid flow from the master cylinder 11 to the respective wheel brake 16 circuits. To control each wheel brake 16 during both normal operation and operation of the anti-lock braking system, an isolation valve 19 and a dump valve 20 is provided for each of the wheel brake 16 circuits. The isolation valve 19 and the dump valve 20 are used to either provide fluid or relieve fluid pressure from each wheel brake 16, which causes the pulsating application of an individual wheel brake 16 for the anti-lock braking system. Additional isolation and dump valves may also be provided to allow fluid flow to the wheel brakes 16 when used in conjunction with other vehicle control systems, although such is not required. For example, the illustrated brake system 10 includes a traction control isolation valve 21 that allows fluid flow from the master cylinder 11 to the individual wheel brakes 16 in conjunction with a traction control system. The dump valves 20 for the individual wheel brakes 16 allow fluid flow from the associated wheel brake 16 to at least one low pressure accumulator 22. Thus, each dump valve 20 is generally disposed between the associated wheel brake 16 and the low pressure accumulator 22. Each dump valve 20 is a normally closed control valve. The isolation valves 19 and dump valves 20 are preferably formed as solenoid valves switchable between two positions, although it will be appreciated that any suitable control valve may be used. The isolation and dump valves 19 and 20, as well as the pump 26, are electrically connected to an electronic control module (not illustrated) and operated to provide desired system braking in a well-known manner. A hydraulic pump 26 may be used to transfer fluid from the low pressure accumulator 22 back to the master cylinder reservoir 12. The HCU 18 may also include other fluid flow devices, such as an attenuator 28, check valves 30 to regulate the direction of fluid flow, and/or restricted orifices 32 to regulate fluid flow, depending upon the system design.

Figure 3:
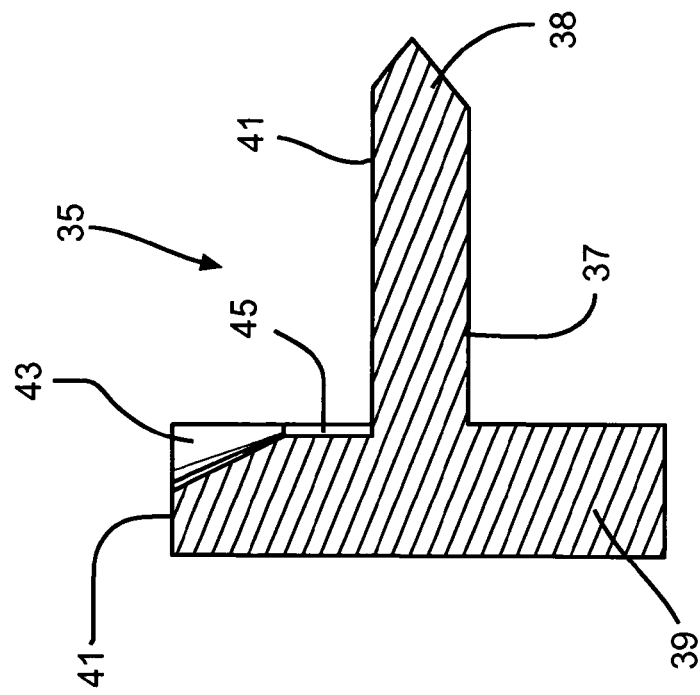
FIG. 3 is a cross-sectional side view of the movable body portion of the self-cleaning orifice of the present invention taken along the line 3—3 of FIG. 2.
Figure 2:
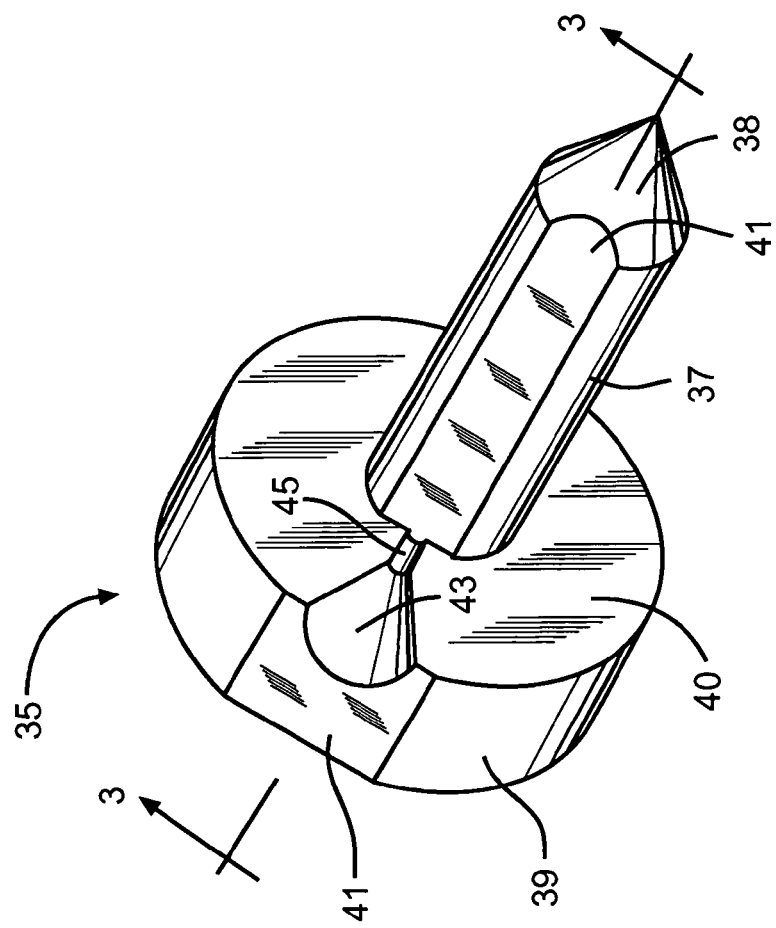
FIG. 2 is a perspective view of the movable body portion of the self-cleaning orifice of the present invention.
Figure 5:
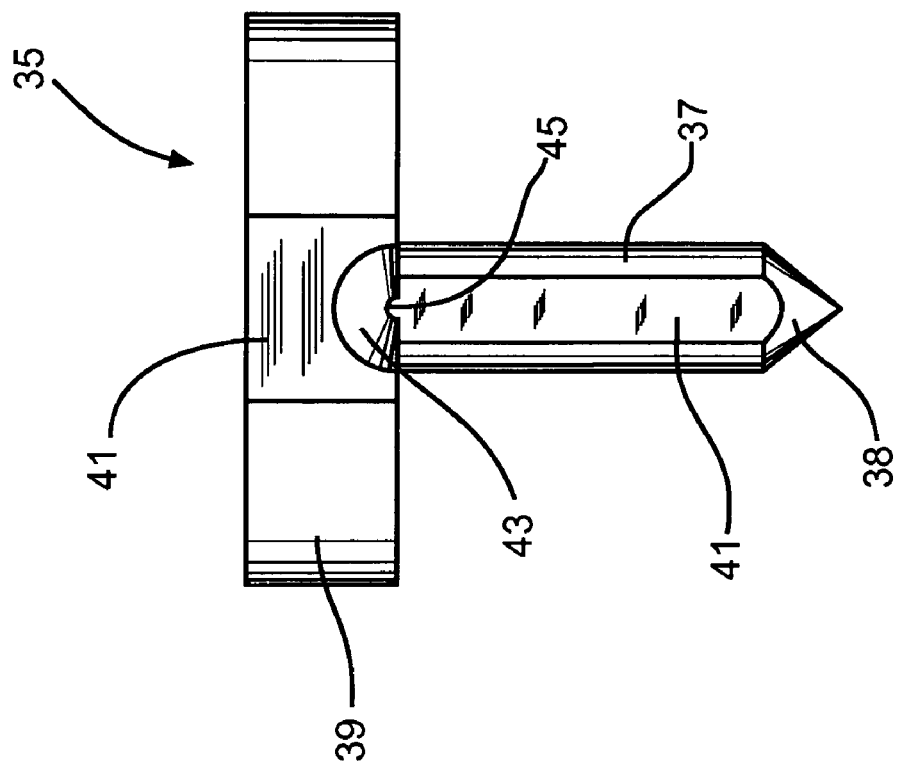
FIG. 5 is a front view of the movable body portion of the self-cleaning orifice of the present invention.
Figure 4:
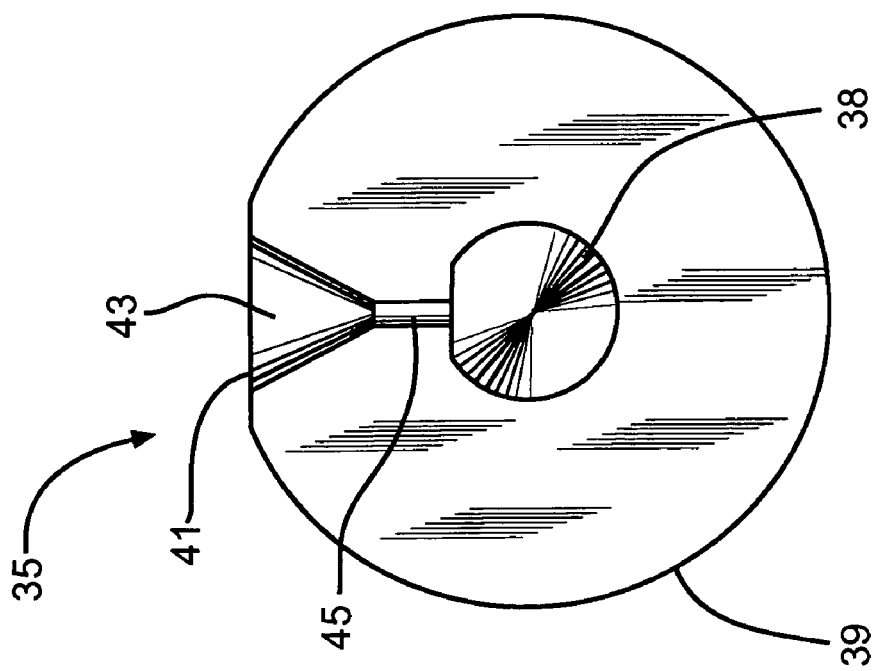
FIG. 4 is an end view of the movable body portion of the self-cleaning orifice of the present invention.

FIGS. 2 through 5 illustrate a flow restricting member used in a flow restricting orifice in accordance with the present invention. The flow restricting member is a movable body, indicated generally at 35, that is positioned within an orifice housing 51 (illustrated in FIGS. 6 and 7). The structure of the orifice housing 51 and the operation of the flow restricting orifice will be explained in greater detail below. The movable body 35 is comprised of a first end 37 and a second end 39. Both the first end 37 and the second end 39 can be of any suitable size and shape that allow the body to be positioned within a bore of the housing 51. Preferably both the first end 37 and the second end 39 are generally cylindrical in shape. The second end 39 of the body 35 preferably has a larger diameter than the first end 37 of the body 35 such that a radially extending flange 40 is created between the first end 37 and the second end 39. The first end 37 may also terminate in a conical shaped tip 38, although such is not required. The first end 37 and the second end 39 of the body 35 are preferably configured such that the body 35 has a generally T-shaped cross section, as seen in FIG. 3, although it will be appreciated that the first end 37 and the second end 39 can be arranged having any suitable cross sectional shape. Both the first end 37 and the second end 39 also contain a fluid flow surface 41. The fluid flow surface 41 is preferably a planar surface located along the outer diameter of both the first end 37 and the second end 39. It will be appreciated, however, that the fluid flow surface 41 can be of any suitable size and shape to allow fluid flow around the movable body 35 when the movable body 35 is placed within the central bore 51. The flange 40 also contains a radially extending groove 43 on a first surface of the flange 40 that is oriented such that the groove 43 is located adjacent to the first end 37 of the body 35. The groove 43 may be of any suitable size and shape. In a preferred embodiment, the groove 43 has a conical shape that extends radially outward along the first surface of the second end 39, and is configured such that the groove 43 has an increasing depth to define a semi-conical divergent flow path. Preferably, the groove 43 is oriented such that the groove 43 extends along the radius of the second end 39 that connects the fluid flow surfaces 41 of the first end 37 and second end 39. Preferably, the length of the groove 43 is less than the length of the radius of the second end 39, although such is not required. Where the length of the groove 43 is less than the radial length of the first surface of the second end 39, a flow channel 45 is provided on the first surface of the second end 39 to connect the fluid flow surfaces 41 of the first end 37 and the second end 39. The fluid flow channel 45 may be of any suitable size and shape. Preferably, the fluid flow channel 45 is a semi-annular groove having a constant depth and is located radially inward on the first surface of the second end 39 with respect to the groove 43. The depth of the fluid flow channel 45 is preferably relatively small with respect to the increasing depth of the flow path created by the conical shape of the groove 43.

Figure 6:
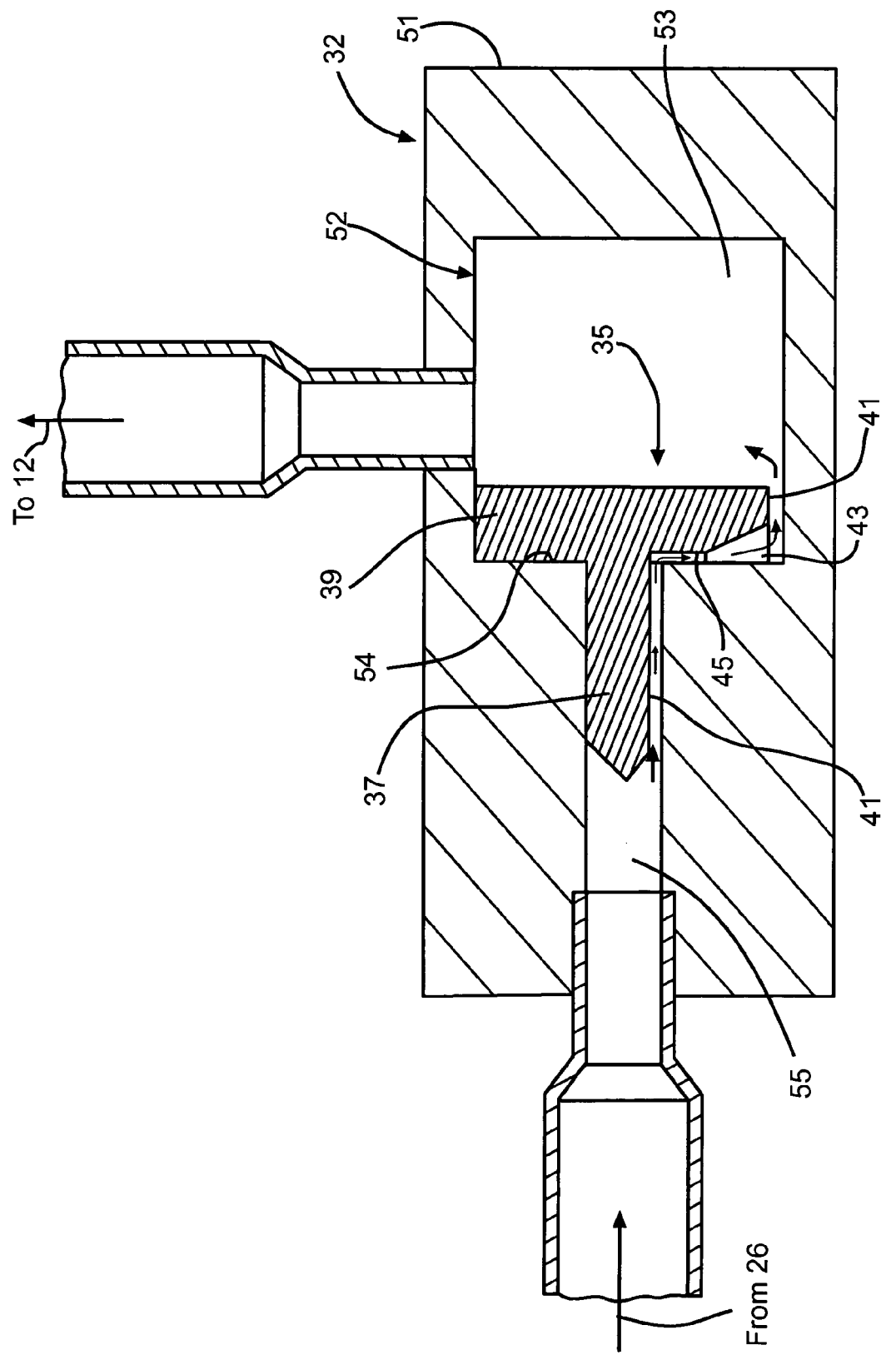
FIG. 6 is a cross-sectional view of the movable body of the self-cleaning orifice positioned within the self-cleaning orifice housing in a flow-restricting orificed position thereof.
Figure 7:
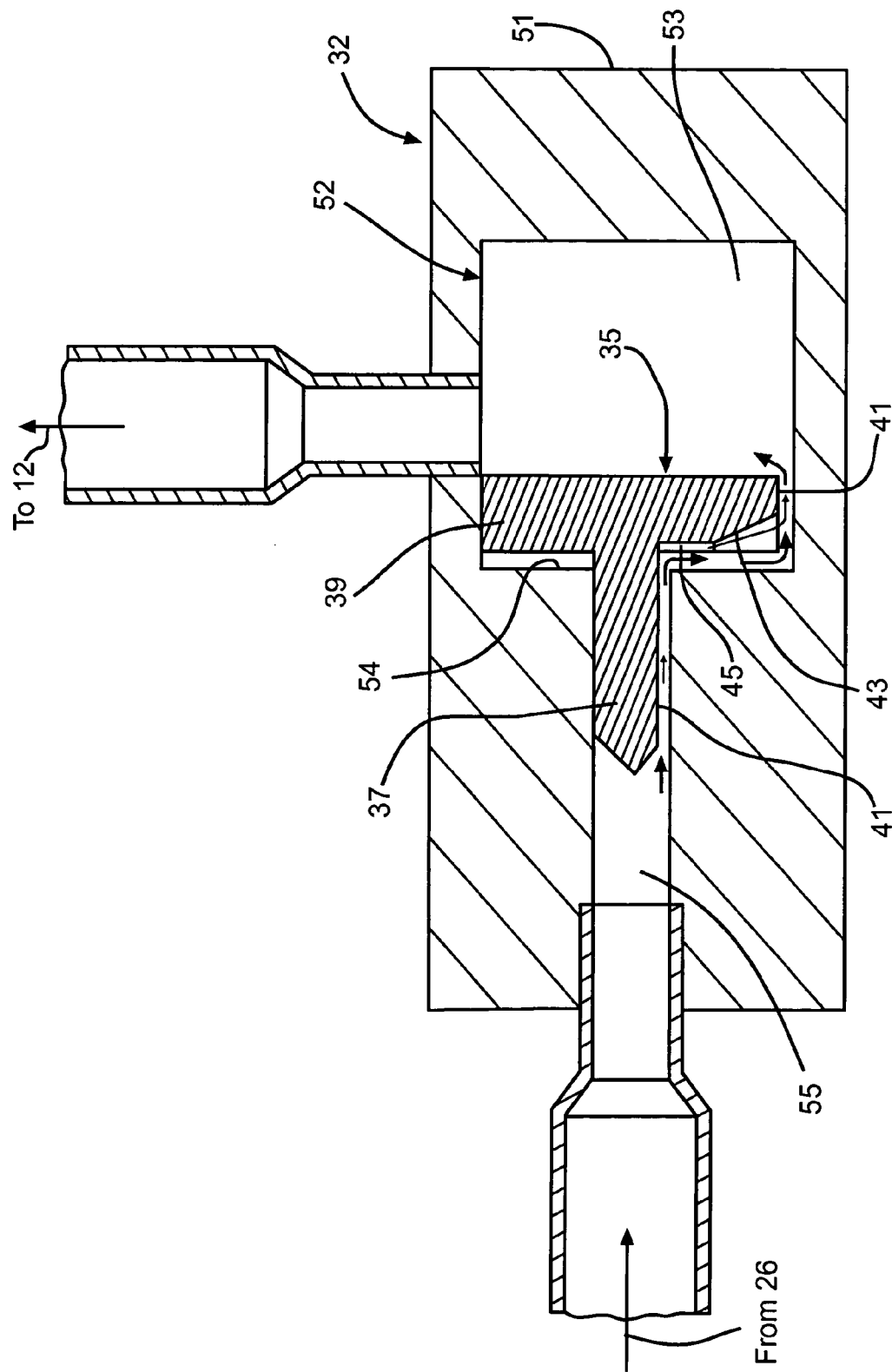
FIG. 7 is a cross-sectional view similar to FIG. 6 illustrating the movable body positioned within the self-cleaning orifice housing in the self-cleaning position thereof.

FIGS. 6 and 7 illustrate the flow restricting orifice 32 of the present invention. The orifice 32 is comprised of the housing 51 having a bore, indicated generally at 52, defined therein. The bore 52 includes an inlet portion 55 having a first diameter and an outlet portion 53 having a second diameter. Preferably, the diameter of the outlet portion 53 is greater than the diameter of the inlet portion 55 such that a seating surface, or shoulder 54 is created at the junction of the inlet portion 55 and the outlet portion 53 of the bore 52. The seating surface 54 is preferably formed as a ninety degree step transition between the inlet portion 55 diameter and the outlet portion diameter 53. It will be appreciated however that the seating surface 54 may be formed in any suitable manner, such as an axially tapered change in diameter, that allows the movable body 35 to be selectively engaged with the seating surface 54. The inlet portion 55 and outlet portion 53 of the bore 52 may then be connected to a respective portion of the fluid flow conduit of the braking system 10 to allow fluid to pass through the flow restricting orifice 32. Preferably, the inlet portion 55 is connected such that the inlet portion 55 receives fluid from the hydraulic pump 26, which pumps fluid from the low pressure accumulator 22 back to the master cylinder reservoir 12. Accordingly, the outlet portion 53 of the bore 52 is preferably connected such that the outlet portion 53 allows fluid to flow to the master cylinder reservoir 12 when the fluid pressure at the inlet portion 55 exceeds the fluid pressure at the outlet portion 53 of the bore 52. By placing the flow restricting orifice 32 in the fluid flow path between the hydraulic pump 26 and the master cylinder 11, fluid pressure is regulated within the braking system 10 by metering the flow from the hydraulic pump 26 to the master cylinder reservoir 12.

The movable body 35 is placed within the bore 52. The first end 37 and the second end 39 of the movable body 35 are slidingly received in the inlet portion 55 and the outlet portion 53 of the bore, respectively. An inlet fluid flow path is created between the first end 37 of the movable body 35 and the wall of the bore 52 along the fluid flow surface 41 of the first end 37. Similarly, an outlet fluid flow path is formed between the second end 39 and the wall of the bore 52 along the flow path of the fluid flow surface 41 of the second end 39. The inlet fluid flow path and the outlet fluid flow path located between the flange 40 and the shoulder 54 of the housing 51 are connected by a restricted fluid flow path created by the flow channel 45 and the groove 43. Thus, fluid can flow from the inlet portion 55 through the inlet fluid flow path, restricted fluid flow path, and outlet fluid flow, and into the outlet portion 53 of the bore 52. The differences in diameter between the first end 37 and the second end 39 of the movable body 35, and between the inlet portion 55 and outlet portion 53 of the bore 52 also allow the movable body 35 to move reciprocally against the shoulder 54 of the bore 52. The purpose of providing for reciprocating motion of the movable body 35 will be discussed in greater detail below.

Referring back to FIG. 1, during the pressure decrease phase of normal anti-lock braking of the braking system 10, fluid flows through the flow restricting orifice 32 upon the opening of a wheel brake 16 dump valve 20 to relieve fluid pressure from the wheel brake 16. When a dump valve 20 is opened, pressurized fluid flows from the associated wheel brake 16 into the low pressure accumulator 22. From the low pressure accumulator 22, the hydraulic pump 26 pumps the fluid through the flow restricting orifice 32 and through the associated isolation valve 19 to allow the fluid to return to the master cylinder reservoir 12.

Referring now to FIG. 6, during the normal anti-lock braking phase of operation, the movable body 35 within the housing 51 is normally in a restricting position, meaning the movable body 35 rests against the shoulder 54 of the bore 52. In the restricting position, fluid flows from the inlet portion 55 to the outlet portion 53 of the bore 52 in the flow restricting orifice 32 via the inlet fluid flow path, the restricted fluid flow path, and the outlet fluid flow path, that is, via the fluid flow surfaces 41, the flow channel 45, and the groove 43 provided in the movable body 35. As discussed above, fluid will flow through the flow restricting orifice 32 when the fluid pressure of the fluid in the inlet portion 55 exceeds the fluid pressure of the fluid in the outlet portion 53 of the orifice 32, as will normally be the case during antilock braking. In some circumstances, however, the pressure regulating capabilities of the orifice 32 may be compromised by the presence of contaminants or debris in the fluid within the orifice 32. When debris enters the inlet portion 55 of the orifice 32, the debris may obstruct the restricted flow path in the flow channel 45 when the movable body 35 is in the restricted position. To remedy such obstruction, the flow regulating orifice 32 of the present invention incorporates a self-cleaning capability.

The position of the movable body 35 in the bore 52 is determined by a balance of forces acting on the movable body 35. Pressure in the inlet portion 55 exerts a force on the axial end face of the first end 37 of the movable body 35 to move the movable body out of the restricted position shown in FIG. 6, and away from the inlet portion 55. Pressure in the inlet portion 55 thus urges the movable body 35 out of engagement with the shoulder 54 and toward the free flow position shown in FIG. 7. Opposing the force exerted by the pressure in the inlet portion 55 is a force exerted by fluid pressure in the outlet portion 53 acting against the axial end face of the second end 39 of the movable body. During ABS braking, pressure from the master cylinder 11 is present in the outlet portion 53. The pressure in the inlet portion, from the discharge of the associated pump 26 is normally higher than the pressure in this outlet portion 53. However, the surface area of the axial end face of the second end 39 is greater than the surface area of the axial end face of the first end 37, so that the net force acting on the movable body 35 due to differential pressure normally acts to move the movable body 35 toward the inlet portion 55 and into engagement with the shoulder 54 (the restricted position).

There are two notable scenarios where the movable body 35 is urged toward the free flow position shown in FIG. 7, and out of engagement with the shoulder 54. The first scenario is during traction control. During the traction control phase of operation, the driver is not stepping on the brake pedal, and no pressure is generated by the master cylinder 11 into the outlet portion 53. In this case, with the pressure in the inlet portion 55 far exceeding the pressure in the outlet portion 53 of the bore 52, the net force acting on the movable body 35 moves the movable body 35 out of engagement with the shoulder 54 and into the free flow position. Thus, fluid from the associated pump 26 is able to flow freely through the orifice 32, with most of the fluid flowing in a bypass flow path that bypasses the restricted flow path of the fluid flow channel 45. The bypass flow path is defined to connect the inlet flow path and the outlet flow path through a region between the shoulder 54 and the adjacent face of the second end 39, outside of the flow channel 45 and the groove 43. This is desirable as it allows the pressure at the brakes 16 to rise rapidly to provide prompt response to a condition triggering the traction control actuation. The fluid flow rate out of the pump 26 is not limited by a fixed orifice of the type known in the prior art.

The second scenario where the movable body 35 moves to the free flow position of FIG. 7 is when the flow path between the inlet portion 55 and the outlet portion 53 becomes obstructed. Typically, the obstruction is caused by a flow blockage of the restricted flow path defined between the shoulder 54 and the walls of the flow channel 45. This causes pressure in the inlet portion 55 to rise relative to the pressure in the outlet portion 53, so that the net forces acting on the movable body 35 act to move the movable body 35 to the free flow position illustrated in FIG. 7. Fluid flowing through the bypass flow path washes over the groove 43 and the flow channel 45, and will tend to dislodge any debris trapped therein. Thus, the orifice 32 is self cleaning. With the fluid flowing through the bypass flow path, the pressure in the inlet portion 55 will tend to fall relative to the pressure in the outlet portion 53, so that the net forces acting on the movable body 35 move the body back to the flow restricted position of FIG. 6.

The conical shape of the groove 43 provides a particular advantage in the operation of the orifice 32. Specifically, the shape of the groove 43 allows the reciprocal movement of the movable body 35 described above to be less affected by fluid temperature variations within the braking system 10. Thus, the conical shape of the groove 43 allows the reciprocal motion of the movable body 35 to be controlled mainly by the pressure differential within the orifice 32.

Figure 8:
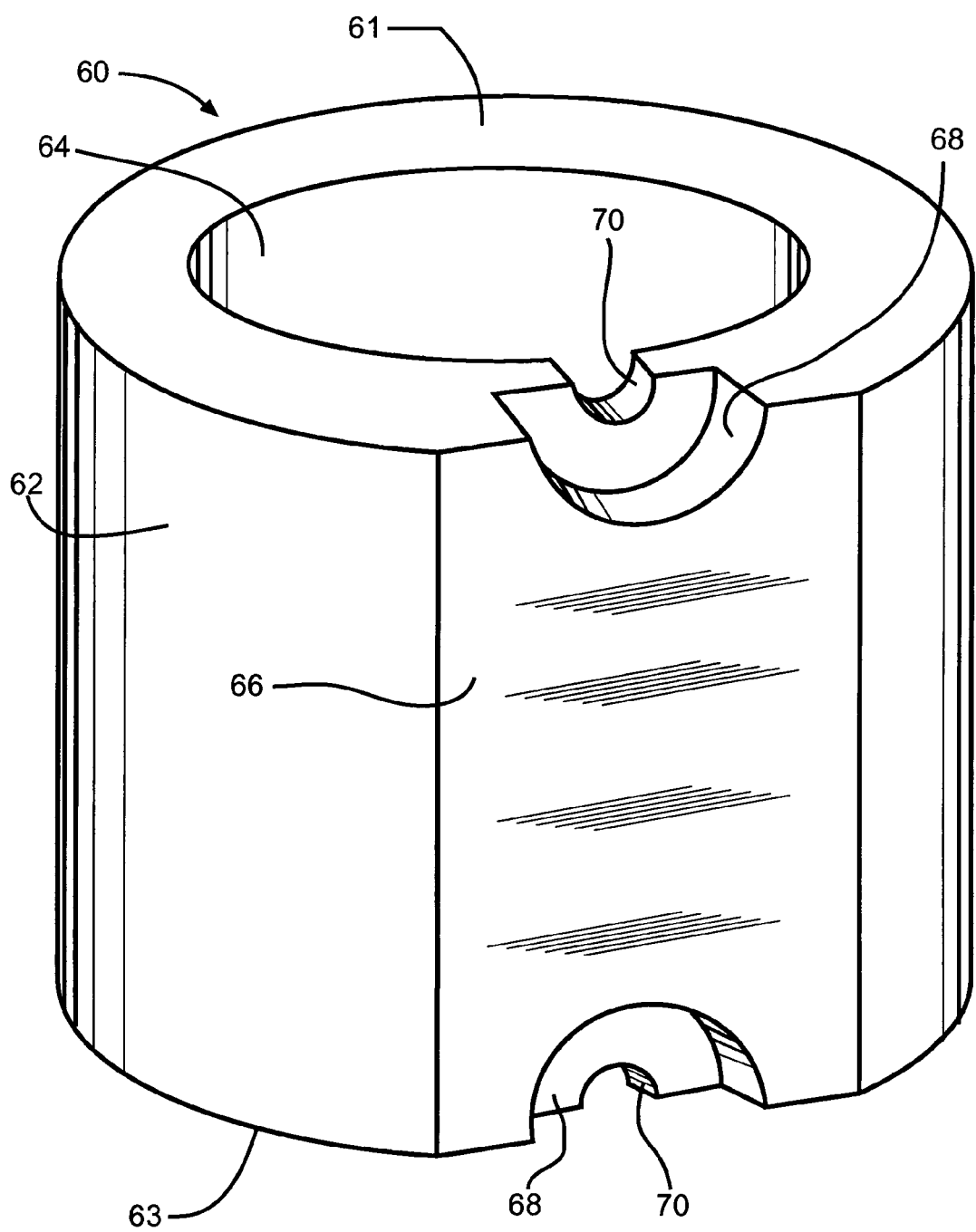
FIG. 8 is a perspective view of an alternate embodiment of the movable body containing grooves on either end of the movable body to allow for reversible installation of the movable body in the self-cleaning orifice housing.
Figure 10:
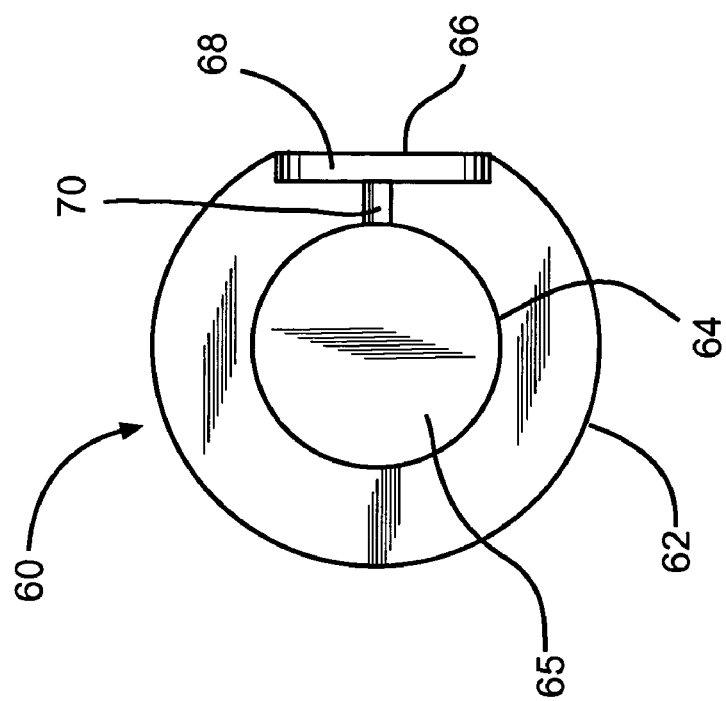
FIG. 10 is an end view of the reversible movable body embodiment of the present invention.
Figure 9:
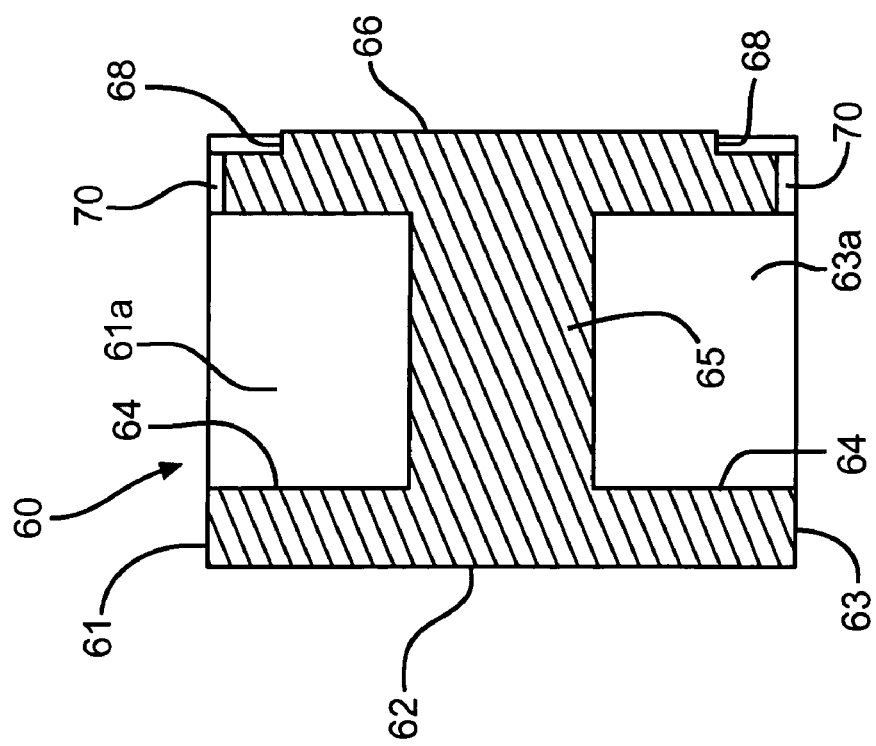
FIG. 9 is a cross-sectional side view of the reversible movable body embodiment of the present invention.

FIGS. 8 through 10 illustrate an alternate embodiment of a movable body portion of a self-cleaning orifice wherein the movable body is reversible. The movable body, indicated generally at 60, has a first end 61 and a second end 63. The movable body 60 is generally tubular in shape. A solid portion 65 is disposed within the movable body 60 between the first end 61 and the second end 63 so that a first pocket 61a is defined in the axial end face of the first end 61, and a second pocket 63a is defined in the axial end face of the second end 63. The solid portion 65 is oriented such that the movable body has a generally H-shaped cross-section, as is best illustrated in FIG. 9. The movable body 60 has both a generally cylindrical inner surface 64 and a generally cylindrical outer surface 62 of each of the pocket 61 a and the pocket 63a. The movable body 60 also includes a preferably planar fluid flow surface 66 extending from the first end 61 to the second end 63 of the outer surface 62 of the movable body 60. The fluid flow surface 66 contains a series of adjacent grooves 68 and 70 of varying diameters and depth in both the first end 61 and the second end 63 of the body 60. The grooves 68 and 70 on the first end 61 extend between the inner surface 64 and outer surface 62 of the movable body 60 with the grooves 68 and 70 cooperating to define a flow path channel between the pocket 61a of the first end 61 and the outer surface 62. Similarly, the grooves 68 and 70 on the second end 63 cooperate to define a flow path channel between the pocket 63a of the second end 63 and the outer surface 62 of the body 60.

Figure 11:
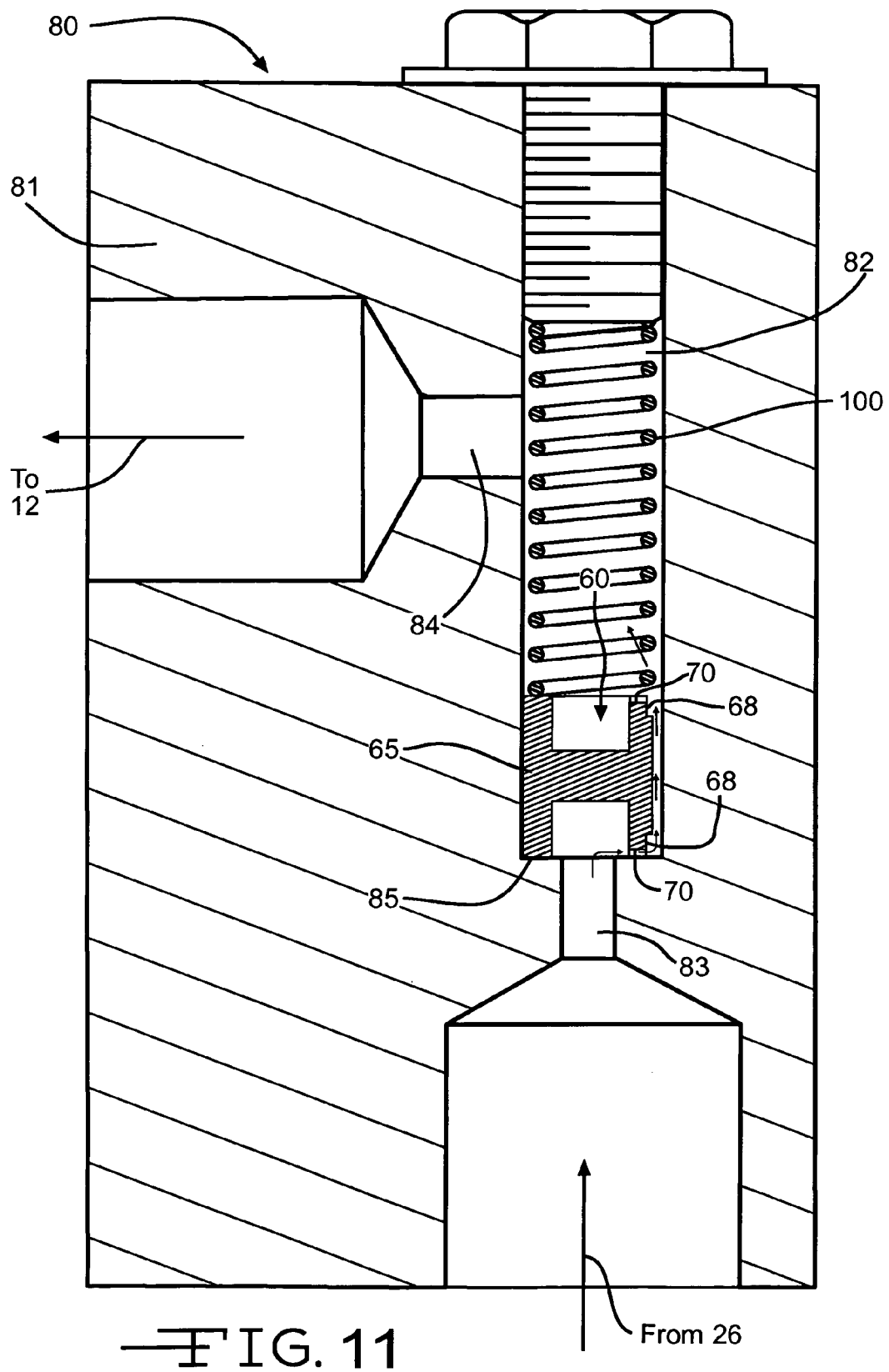
FIG. 11 is a cross-sectional view of the reversible movable body within the self-cleaning orifice housing of the present invention in a flow restricting orificed position thereof.

FIG. 11 illustrates an alternate embodiment of a housing for a self-cleaning orifice, indicated generally at 80, utilizing the reversible movable body 60 described above. The orifice 80 is comprised of a housing 81 having a central bore 82 defined therein. The bore 82 can be of any suitable size and shape to accommodate the reversible movable body 60. In a preferred embodiment, the bore 82 is generally cylindrical in shape and slidingly receives the movable body 60. The bore 82 may be connected to a respective portion of the fluid flow conduit of the braking system 10 to allow fluid to pass through the flow restricting orifice 80. Preferably, the bore 82 has an inlet portion 83 that is connected such that the inlet portion 83 receives fluid from the hydraulic pump 26, which pumps fluid from the low pressure accumulator 22 back to the master cylinder reservoir 12. Accordingly, the bore 82 also has an outlet portion 84 that allows fluid to flow to the master cylinder reservoir 12 when the fluid pressure at the inlet portion 83 exceeds the fluid pressure at the outlet portion 84 of the bore 82. Preferably, the diameter of the inlet portion 83 is less than the diameter of the bore 82, which subsequently creates a seating surface or shoulder 85 at the junction of the inlet portion 83 and the bore 82. The shoulder 85 is preferably formed as a ninety degree step transition between the inlet portion 83 diameter and the bore diameter 82. It will be appreciated however that the shoulder 85 may be formed in any suitable manner that allows the movable body 60 to be selectively engaged with the shoulder 85.

The movable body 60 portion of the flow restricting orifice 80 may be placed within the bore 82 such that either the first end 61 or the second end 63 of the movable body 60 engages the shoulder 85 of the bore 82. The symmetrical placement of the grooves 68 and 70 along the fluid flow surface 66 at both the first end 61 and the second end 63 of the movable body 60 provides reversibility of the movable body 60, as a fluid flow path is created by the grooves 68 and 70 at both ends 61 and 63 of the movable body 60. Thus, operation of the orifice 80 is similar to the operation described above with respect to the orifice 32 of the first embodiment, shown in FIGS. 2 through 7, with the grooves 68 and 70 functioning similar to the fluid flow channel 45 and the groove 43, respectively, as described in the first embodiment.

As illustrated in FIG. 11, a light spring 100 may also be disposed within the bore 82, although it will be appreciated that the spring 100 is not required for proper operation. of the orifice 80. The spring 100 acts to bias the movable body 60 into engagement with the shoulder 85, so that the orifice 80 will act reliably in the event that the orifice 80 is mounted in an inverted position. Preferably, the spring 100 does not contribute substantially to the net forces acting on the movable body 60, exerting a force that barely exceeds the weight of the movable body 60. Such a spring 100 could also be added to the embodiment shown in FIG. 7, but is not normally required for proper operation.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A self-cleaning orifice for regulating fluid flow, comprising:
a housing having a bore defined through said housing, said bore having an inlet portion defining a first diameter and an outlet portion defining a second diameter, wherein said diameter of said inlet portion is less than said diameter of said outlet portion, and wherein said inlet portion and said outlet portion are arranged such that a shoulder is defined by said differing diameters of said inlet portion and said outlet portion of said bore; and
a movable body disposed within said outlet portion of said bore, said body defining a diameter less than said diameter of said outlet portion, said body having a first end and a second end, said body having a generally tubular shape at said first end and said second end thereof, said first end and said second end having a generally cylindrical inner surface and a generally cylindrical outer surface, said body having a flat surface extending from said first end to said second end of said outer surface of said body, said flat surface having a channel on at least one of said first end and said second end thereof, said channel extending between said inner surface and said outer surface of said body, wherein said body is capable of reciprocal motion that places said first end or said second end into engagement with said shoulder of said bore such that a flow path is defined through said channel on said first end or said second end.

2. The self-cleaning orifice of claim 1 wherein said channel comprises a series of adjacent grooves of varying diameters, said grooves extending between said inner surface and said outer surface of said body.

3. The self-cleaning orifice of claim 1 wherein said movable body includes a solid portion disposed between said first end and said second end of said movable body.

4. The self-cleaning orifice of claim 3 wherein said solid portion is oriented between said first end and said second end such that said movable body has a generally H-shaped cross section.

5. The self-cleaning orifice of claim 3 wherein said solid portion is disposed within said movable body such that a first pocket is defined in the axial end face of said first end of said movable body and a second pocket is defined in the axial end face of said second end of said movable body.

6. The self-cleaning orifice of claim 5 wherein said channel located on said first end of said movable body defines a flow path between said first pocket and the outer surface of said movable body, and wherein said channel located on said second end of said movable body defines a flow path between said second pocket and the outer surface of said movable body.

7. The self-cleaning orifice of claim 1 wherein said flat surface of said movable body has a channel on both said first end and second end thereof such that said movable body is reversible, said channels on said first end and said second end each extending between said inner surface and said outer surface of said body.

8. A self-cleaning orifice, comprising:
a housing having a bore formed therethrough, said bore having an inlet portion and an outlet portion, a seating surface being defined between said inlet portion and said outlet portion; and
a movable body reciprocally disposed in said bore, wherein said movable body has a first end and a second end, said body having a generally tubular shape at said first end and said second end thereof, said first end and said second end having a generally cylindrical inner surface and a generally cylindrical outer surface, said body having a flat surface extending from said first end to said second end of said outer surface of said body, said flat surface having a channel on at least one of said first end and said second end thereof, said channel extending between said inner surface and said outer surface of said body, wherein said body is capable of reciprocal motion that places said first end or said second end into engagement with said seating surface of said bore such that a flow path is defined through said channel on said first end on said second end.

9. The self-cleaning orifice of claim 8 wherein said movable body includes a solid portion disposed between said first end and said second end of said movable body.

10. The self-cleaning orifice of claim 8 wherein said solid portion is oriented between said first end and said second end such that said movable body has a generally H-shaped cross section.

11. The self-cleaning orifice of claim 8 wherein said solid portion is disposed within said movable body such that a first pocket is defined in the axial end face of said first end of said movable body and a second pocket is defined in the axial end face of said second end of said movable body.

12. The self-cleaning orifice of claim 11 wherein said channel located on said first end of said movable body defines a flow path between said first pocket and the outer surface of said movable body, and wherein said channel located on said second end of said movable body defines a flow path between said second pocket and the outer surface of said movable body.

13. The self-cleaning orifice of claim 8 wherein said channel comprises a series of adjacent grooves of varying diameters, said grooves extending between said inner surface and said outer surface of said body.

14. The self-cleaning orifice of claim 8 wherein said flat surface of said movable body has a channel on both said first end and second end thereof such that said movable body is reversible, said channels on said first end and said second end each extending between said inner surface and said outer surface of said body.

15. A self-cleaning orifice, comprising:
a housing having a bore formed therethrough, said bore having an inlet portion and an outlet portion, a seating surface being defined between said inlet portion and said outlet portion; and
a movable body reciprocally disposed in said bore, wherein said movable body has a first end and a second end, said body having a generally tubular shape at said first end and said second end thereof, said first end and said second end having a generally cylindrical inner surface and a generally cylindrical outer surface, said body having a flat surface extending from said first end to said second end of said outer surface of said body, said flat surface having a channel on both of said first end and said second end thereof such that said movable body is reversible, said channel on said first end and said channel on said second end extending between said inner surface and said outer surface of said body, wherein said body is capable of reciprocal motion that in a first position places one of said first end and said second end into engagement with said seating surface of said bore such that the only flow path between said inlet portion and said outlet portion is defined between said seating surface and said movable body through said channel of said one of said first end and said second end, and in a second position said movable body is spaced apart from said seating surface such that a flow path is defined between said inlet portion and said outlet portion that is not restricted through said channel of said one of said first end and said second end.

16. A self-cleaning orifice, comprising:
a housing having a bore formed therethrough, said bore having an inlet portion and an outlet portion, a seating surface being defined between said inlet portion and said outlet portion; and
a cylindrical body having opposed axial ends, said body being disposed in said bore, said body having a recessed portion on each of said opposed axial ends thereof, said body having an axially extending surface along the length of said body, said axial surface cooperating with said housing to define a fluid conduit extending between said axial ends of said body, said body defining a groove on each axial end thereof for providing fluid communication between said axial surface and each of said recessed portions, said body being capable of motion that moves an axial end of said body into and out of engagement with said seating surface of said bore.

* * * * *